(No Model.)
T. AHEARN.
ELECTRIC WATER HEATER.
No. 481,291.      Patented Aug. 23, 1892.
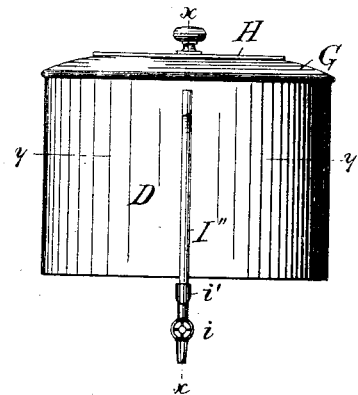
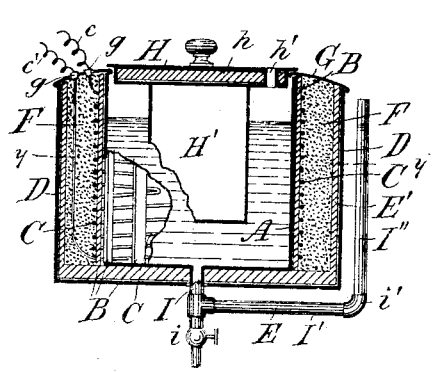
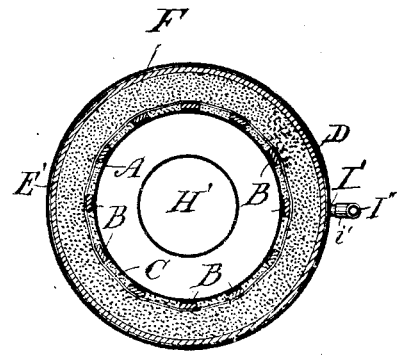
Witnesses:
Chas. Raley.
Arthur Cantin.
Thomas Ahearn
Inventor
by A. Harvey
Attorney.

UNITED STATES PATENT OFFICE.

THOMAS AHEARN, OF OTTAWA, CANADA.

ELECTRIC WATER-HEATER.

SPECIFICATION forming part of Letters Patent No. 481,291, dated August 23, 1892.

Application filed April 9, 1892. Serial No. 428,425. (No model.)

*To all whom it may concern:*

Be it known that I, THOMAS AHEARN, of the city of Ottawa, in the Province of Ontario, and in the Dominion of Canada, have invented certain new and useful Improvements in Electric Water-Heaters; and I do hereby declare that the following is a full, clear, and exact description of the same, reference being had to the accompanying drawings, forming a part hereof.

My invention, which will be hereinafter fully set forth and claimed, relates to devices for heating water by means of an electric current.

Figure 1 is an elevation of my improved water-heater. Fig. 2 is a vertical section of the same on line $x\,x$, Fig. 1. Fig. 3 is a horizontal section on line $y\,y$, Figs. 1 and 2.

A is an open vessel, preferably metallic and a good conductor of heat—such as copper, tin, or thin cast-iron—adapted to hold water. Upon this are placed strips of insulating material B, such as asbestus. Upon this insulation is wound a coil of wire or strip C of refractory material having a high electric resistance—such as German silver—and the terminals connected with leads $c\,c'$ of an electric circuit. The vessel thus insulated, coiled, and connected is placed in a larger vessel or container D, large enough to leave an annular space all round the inner vessel A and also a space between the two bottoms. The latter space is packed with a good non-conductor of heat and electricity E—such as asbestus—and the annular space is filled with powdered whiting, fire-clay, or other refractory material F, which is also a non-conductor of electricity. The interior of the vessel D is also lined with asbestus or other non-conductor of heat E'. The top of the annular space is made up with a ring cover G, provided with insulators $g\,g$, through which the leads $c\,c'$ are passed. The inner vessel A is provided with a removable hollow cover H, the interior of which is packed with a good non-conductor of heat, such as asbestus $h$. An opening $h'$ is provided in said cover convenient for filling the vessel.

To the interior of the cover H may be attached a closed water-tight vessel H' of such a size as to reduce the water-space in the vessel A and form an annular space around said vessel H' and a space between its bottom and that of the vessel A.

I is the draw-off pipe, preferably secured in the bottom of the vessel A and passing through the bottom of the container D and provided with a suitable faucet $i$. To said pipe I may be attached a branch I', provided with an elbow $i'$, in which a gage-glass I'' is secured. The outer vessel or container D may be further packed externally with a nonconductor of heat and suitably lagged with wood or other material, if desired. The vessel A is filled with water, the level of which may be readily observed in the gage-glass I''. A switch being provided in the leads $c\,c'$ at a suitable point, the current may be turned on or off when desired. The coil C is of such a sectional area that it is heated by the passage of a current without being fused. The heat thus created in the coil is conducted by the filling F to the vessel A and by it communicated to the water in said vessel. The water-level in the vessel A may be maintained uniformly by any well-known automatic regulating device suitably connected with said vessel.

I claim as my invention—

1. In an electric water-heater, the combination of an insulated open water-tight vessel A, a coil of refractory wire or strip C, of low electric conductivity, having its terminals connected by leads passing through insulators, a containing-vessel D, lined internally with a layer of non-heat-conducting material and large enough to form an annular space around said inner vessel and affording space for a thick layer of non-conducting material at the bottom, a covering G on the annular space containing insulators to pass the leads of the circuit, a removable hollow cover H, a draw-off pipe I, with faucet, and a filling of powdered whiting, fire-clay, or other refractory material in the space between the inner and outer vessel and in the cover, substantially as set forth.

2. In an electric water-heater, the combination of an open water-tight vessel A, insulating-strips B, laid upon the exterior of said vessel, a coil C, wound upon said insulating-strips and connected with a circuit, a hollow cover H, filled with non-conductors of heat and provided with an opening $h'$, a water-tight vessel H', connected to the bottom of said cover and smaller than the vessel A, a draw-off pipe I, secured in the bottom of the vessel A and provided with faucet, a branch I' on said pipe, and a gage-glass I'', secured to said branch, substantially as set forth.

In testimony whereof I have signed in the presence of the undersigned witnesses.

T. AHEARN.

Witnesses:
A. HARVEY,
A. TROWSE.